April 21, 1953                  J. H. HALL                  2,635,689

ELECTRICAL TIMING SYSTEM AND APPARATUS

Filed Aug. 30, 1950                                          2 SHEETS—SHEET 1

Inventor
James H. Hall
by Albert F. McCaleb
Attorney

Inventor
James H. Hall
by Albert H. McCabe
Attorney

Patented Apr. 21, 1953

2,635,689

UNITED STATES PATENT OFFICE 2,635,689

ELECTRICAL TIMING SYSTEM AND APPARATUS

James H. Hall, Lake Bluff, Ill., assignor to Fansteel Metallurgical Corporation, North Chicago, Ill., a corporation of New York Application August 30, 1950, Serial No. 182,346

1 Claim. (Cl. 161—1)

This invention relates to an electrical timing system and apparatus adapted to use in such a system, and more particularly to a system and apparatus adapted to uses, such as the charging of storage batteries, and which afford extreme simplicity in operating technique and skill required, as well as safety factors for the protection of the equipment, such as batteries, with which they are used.

Some classes and types of apparatus, such as electrically driven industrial trucks, utilize storage batteries as a power source and are subject to somewhat varying amounts of use during working periods. In order to keep the batteries charged for such service, they are charged during the time intervals between working periods, and with as little attention as possible. My disclosed timing system and apparatus are well adapted automatically to afford the desired controls and safety factors for such battery charging and like service. In addition to providing for ease and simplicity in making the required electrical connections, my disclosed system and apparatus afford simplicity in making adjustments for starting. In addition, the system and apparatus provide for sequential and automatically effected controls during operation, and for stopping operation at the end of an operating cycle.

One of the general objects of this invention is to provide a timing system and apparatus adapted to simplicity of operation and which are suited to the automatic control of electrical operations, such as the charging of storage batteries.

As another and more specific object, my invention has within its purview the provision of a system embodying a plurality of time control units, one of which determines a maximum period of operation, and the other of which is for the determination of a period less than the said maximum and started upon the occurrence of a predetermined event.

My invention has for another object the provision of a system as set forth in the preceding object and wherein the time control units are set to their normal starting positions by movement of a single control element.

Another object of this invention is to provide a time control switch mechanism embodying two time control switches adapted to actuation for effecting an initial setting by a single control element, and so constructed and arranged that one of the time control switches is automatically returned to its starting position while the other is being adjusted to a selected starting position.

It is a further object of my invention to provide a time controlled battery charging system which provides a predetermined maximum time period for charging the battery at a selected high charging rate and a predetermined maximum time period for charging the battery at a lower rate if and when the battery voltage is brought up to a defined value.

Other objects and advantages of this invention will be apparent also from the following description of an exemplary embodiment of my invention disclosed for illustrative purposes by reference to the accompanying two sheets of drawings, in which Fig. 1 is a top plan view of a preferred embodiment of my timing apparatus, wherein parts are cut away to show details of the illustrated structure;

Figure 4:
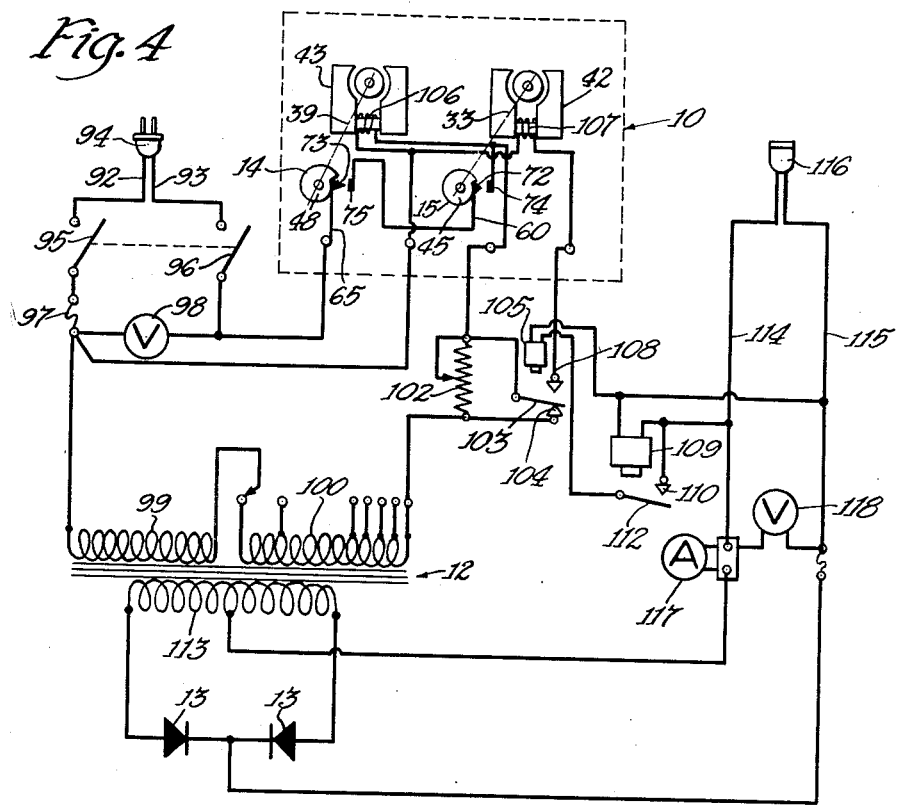
Fig. 4 is a schematic circuit diagram of electrical apparatus adapted to the charging of storage batteries and embodying the timing apparatus depicted in Fig. 1.

Considered generally, the exemplary embodiment of my invention which is illustrated herein for illustrative purposes includes timing apparatus 10 which controls periods of operation of electrical apparatus, such as a battery charging system which is depicted schematically in Fig. 4. In the disclosed system and apparatus, the timing apparatus 10 is connected in series with the input circuit to a battery charging transformer 12 and associated rectifier elements 13 for supplying direct current to output leads for battery charging and like purposes. The timing device 10, in the present instance, includes two timing switches 14 and 15, one of which determines a selected maximum operating time for the system, while the other determines a preselected shorter time period and is utilized for determining the period of the finish charge, after the battery voltage reaches a predetermined value.

Referring in greater detail to the structure of my disclosed timing apparatus 10 which is illustrated in Figs. 1, 2, 3, 5 and 6, and as shown diagrammatically in Fig. 4, this apparatus includes a housing 16 made of sheet metal and having a cover 17 and a mounting panel 18 which is supported internally of the housing in spaced relationship to the cover. At one end of the housing, mounting plates 19 and 20 are supported in spaced relationship to one another and in spaced relationship to the panel 18 by posts 22 and spacing collars 23. At the other end of the housing, similar mounting plates 24 and 25 are supported below the panel 18, in spaced relationship to the panel and in spaced relationship to one another by posts 26 and spacing collars 27.

The panel 18 and the mounting plates 19 and 20 have aligned bearing bores 28, 29 and 30 therein which support shafts 32 and 33 in axially aligned relationship; the shafts 32 and 33 being drivingly connected by a friction clutch 34 located between the mounting plates 19 and 20. Similarly, aligned bearing bores 35, 36 and 37 in the panel 18 and the mounting plates 24 and 25 respectively support shafts 38 and 39 in axially aligned relationship; the latter shafts being drivingly connected by a friction clutch 40 located between the mounting plates 24 and 25.

As diagrammatically depicted in Fig. 4, the shafts 33 and 39 are drivingly connected by motors 42 and 43, which motors are preferably of the self-starting synchronous type and may have the same or different operating speeds, depending upon the range of operating periods desired. By way of example, the timing period for the motor 42 in the present instance is approximately three hours while the motor 43 may time a period up to nine hours. Although not illustrated in detail herein, the motors 42 and 43 are usually connected to the respective shafts 33 and 39 through gearing such that the maximum period which is to be timed by either motor produces somewhat less than one revolution of each of the shafts 33 and 39 during the timed interval.

In my disclosed structure, the clutch 34 includes a driving plate 44 and a driven plate 45 which are drivingly connected by an intervening ring 46 of friction material. Likewise, the clutch 40 has a driving plate 47 and a driven plate 48 drivingly connected by an intervening ring 49 of friction material. In addition to serving as clutch plates, the driven plates 45 and 48 serve as switch actuating cams having peripheral cam surfaces 50 and 52, respectively.

Figure 5:
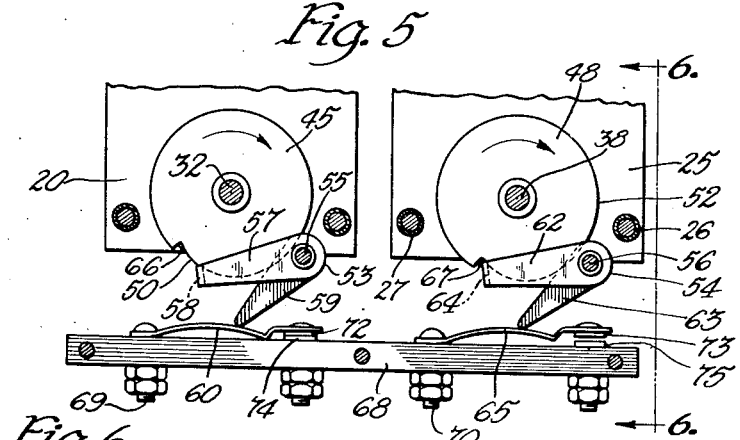
Fig. 5 is a fragmentary top sectional view taken substantially on a line 5—5 of Fig. 2 and in the direction indicated by arrows.
Figure 6:
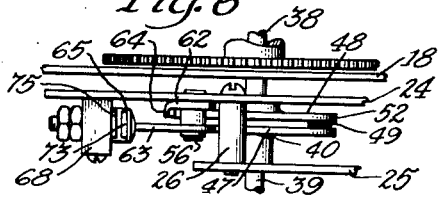
Fig. 6 is a fragmentary end view in elevation, taken substantially as indicated by a line 6—6 in Fig. 5 and accompanying arrows.

As shown in Figs. 5 and 6, bell crank levers 53 and 54 are supported for rotational movement on mounting posts 55 and 56. The bell crank lever 53 has an arm 57, at the extending end of which is a cam engaging end portion 58 aligned for engagement with the cam surface 50. Another arm 59 of the bell crank lever 53 engages a resilient switch arm 60, which switch arm normally biases the bell crank lever in a direction such that it holds the cam engaging end portion 58 of the arm 57 in contact with the cam surface 50.

The bell crank lever 54 is similarly constructed and arranged, and has arms 62 and 63, the former of which has a cam engaging end portion 64 aligned for engagement with the cam surface 52, and the latter of which engages a resilient switch arm 65.

The cam surfaces 50 and 52 include notches 66 and 67, one end of each of which is terminated by an abrupt shoulder, and the other end of which curves gradually into the substantially circular cam surface, whereby rotational movement of each of the cams from a selected position and in the direction indicated by arrows in Fig. 5 holds the switch contacts closed until the cam engaging end portion of the bell crank drops into the notch to effect an abrupt break.

As also shown in Figs. 5 and 6, a strip of insulating material 68 is mounted within the housing and secured to extending portions of the mounting plates 19 and 24. This strip of insulating material serves as an insulating support for switches which include the resilient switch arms 60 and 65; those switch arms each being secured at one end to the insulating strip by fastening means such as screws 69 and 70. At the opposite ends of the resilient arms 60 and 65, contacts 72 and 73 are secured thereto in alignment for engagement with stationary contacts 74 and 75, which latter contacts are also secured to the insulating strip 68.

From the foregoing description, it may be readily understood that the respective cams are driven by the motors 42 and 43 at predetermined rates. With the disclosed structure, the switch contacts associated with each of the cams are held closed during the major portion of one revolution of each of the cams. At the end of a timed period, the cam engaging portions of the bell crank arms drop into the cam notches to open the respective contacts. The rate for each cam being predetermined, the timing of selected intervals less than that required for one revolution of each of the cams can be timed by selecting the starting position of each cam. In order that the positions of the cams may be readily adjusted without turning the motors and any intervening drive mechanism, the friction clutches 34 and 40 have been provided. Additionally, and to adapt the disclosed timing apparatus to use in the disclosed system, I have provided a mechanism for setting the cams to their starting positions.

Figure 1:
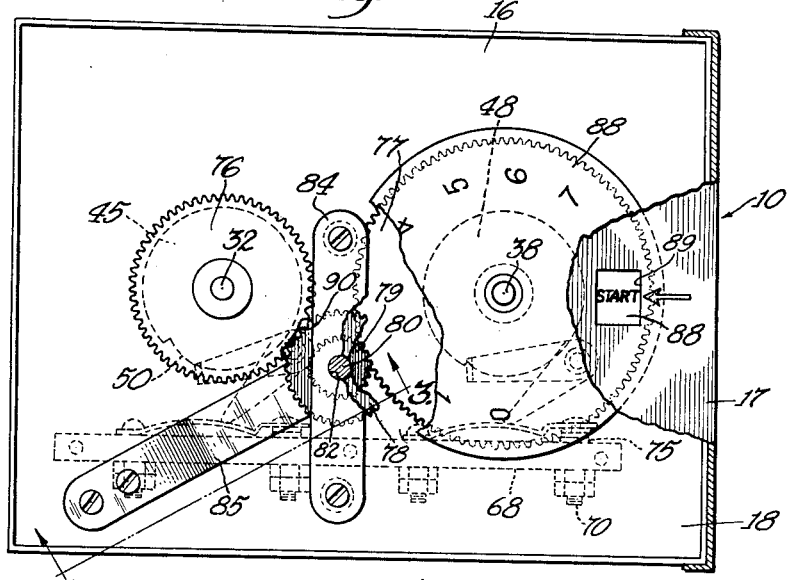
Figure 2:
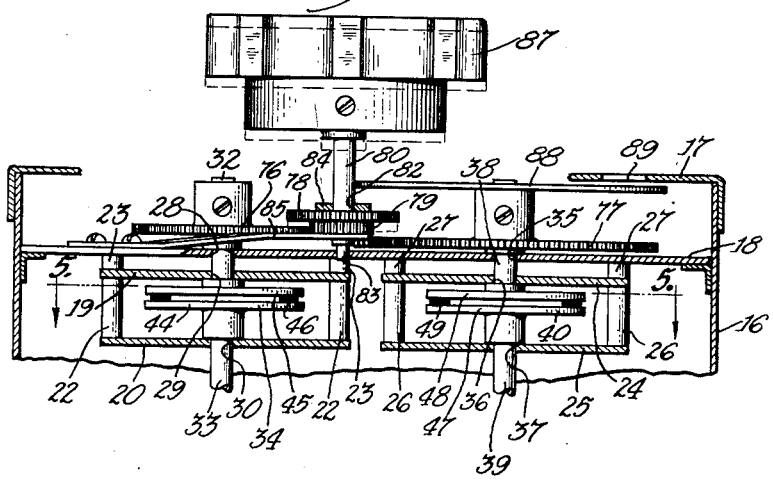
Fig. 2 is a fragmentary side view with certain parts shown in section to illustrate the timing apparatus.

As depicted in Figs. 1 and 2, gears 76 and 77 are secured to the shafts 32 and 38, respectively, and upon which shafts the combination cam and clutch plates 45 and 48 are drivingly mounted. The gears 76 and 77 are carried between the panel 18 and cover 17 within the housing and are in different planes, so as to be adapted to engagement by pinions 78 and 79 mounted in adjacent and concentric relationship on a shaft 80. The shaft 80 extends through the cover 17 and is supported for rotation in bearing bores 82 and 83 in a supporting strip 84 and in the panel 18; the supporting strip 84 being secured to the panel 18 and spaced therefrom.

Figure 3:
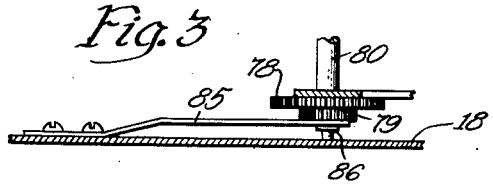
Fig. 3 is a fragmentary side sectional view taken substantially on a line 3—3 of Fig. 1 and in the direction indicated by arrows.

As shown in Figs. 2 and 3, the pinions 78 and 79 are disposed between the supporting strip 84 and the panel 18, with space provided for axial movement of the shaft 80. Normally the pinions are biased by a leaf spring 85 to a position such that they are out of engagement with the gears 76 and 77, and the pinion 78 engages the support strip 84 to limit movement of the shaft in one direction. When the shaft is moved axially against the biasing force of the leaf spring 85, a shoulder 86 thereon engages the surface of the panel 18 to limit the movement to a position in which the pinion 78 is drivingly engaged with the gear 76 and the pinion 79 is drivingly engaged with the gear 77.

A manually operable knob 87 is secured to the outer end of the shaft 80 for effecting both axial and rotational movement of the shaft. During rotational movements of the shaft 80, the cams are turned to their respective starting positions. In the disclosed timing apparatus I have provided a calibrated disc 88 on the shaft 38, which disc has indicia visible through an opening 89 in the cover. By observation of the indicia, the starting position for the cam 48 may be selected.

Since, in the present instance, a predetermined time interval is to be measured by the cam 45, the gear 76 has a portion 90 at which the teeth are removed to an extent such that when the pinion 78 reaches that portion, it will no longer turn the gear 76. The gear and pinion ratios are chosen so that a relatively small amount of movement of the gear 77 will require sufficient rotation of the shaft 80 and knob 87 to turn the gear 76 to its starting position determined by the portion 90.

In the disclosed system and apparatus, the timing switch 15, which embodies the cam 45 and the setting gear 76 for effecting the timing of a predetermined and relatively short period, is utilized for determining the time of the finish charge. The other switch 14, which is driven by the motor 43 and adjustable through the action of the gear 77 to a position selected by observation of indicia on the calibrated disc 88, is utilized for determining an over-all or maximum charging period.

As shown in Fig. 4, input leads 92 and 93 are adapted to connection to a power source through a connector plug 94. A line switch having blades 95 and 96 is connected in series with the input leads. A fuse 97 is preferably connected in series with one of the input leads and a volt meter 98 is connected across the input leads to provide a designation of the line voltage. The input lead 92 is connected directly to a primary winding 99 of the transformer 12 when the line switch is closed.

The contacts 73, 75, 72 and 74 of the timing switches 14 and 15 are connected in series and those series-connected switch contacts are connected in series with the input lead 93 between that input lead and an auxiliary primary winding 100 of the transformer 12. As an additional element in the circuit between the series-connected contacts of the timing switches and the primary winding of the transformer, an adjustable impedance 102 is provided. This impedance is normally short-circuited by contacts 103 and 104 of a relay having an actuating electromagnet 105. As is generally understood in the art, the auxiliary primary winding 100 is tapped and is provided so that compensation may be made for variations in line voltage and aging of the rectifier elements.

The motor 43 which operates the timing switches 14 for determining the over-all or maximum time period has an operating winding 106 connected across the input leads through the series-connected timing contacts, so that after the initial setting of the timing switches, the motor 43 operates from the time the line switch is closed. An operating winding 107 of the motor 42, however, has one end connected directly to one of the input leads, while the other end is connected to the other input lead through normally open contacts 108 and 109 of the relay actuated by electromagnet 105. Thus, the operation of the timing switch 15 is dependent upon closing of the contacts 108 and 109 by energization of the electromagnet 105. When such energization of the electromagnet 105 occurs, the short circuit across the impedance 102 is broken to connect the impedance in series with the primary winding of the transformer, thereby reducing the input current to the transformer. In the disclosed system, energization of the electromagnet 105 is controlled by a voltage responsive relay having an actuating electromagnet 109 and normally open contacts 110 and 112.

A secondary winding 113 of the transformer 12 has its ends connected to the rectifier elements 13 and is center-tapped so as to provide full wave rectification; the direct current therefrom being delivered to output leads 114 and 115. In the present instance, a connector plug 116 is provided on the output leads to facilitate the making of connections to a battery which is to be charged. An ammeter 117 is connected in series with the output lead 114 and a volt meter 118 is connected across the output leads. Also, the actuating electromagnet 109 of the voltage responsive relay is connected across the output leads 114 and 115.

With the disclosed system and apparatus the timing switches are set to their starting positions by pressing the knob 87 inwardly and turning it while watching the indicia on the disc 88 through the opening 89. The operation of the single knob effects the setting of both timing switches. The main line switch may then be closed to start the charging cycle. This starts the operation of the timing switch 14 for determining the over-all or maximum period for charging the battery. If and when the battery voltage reaches a predetermined value during the charging cycle, the voltage responsive relay will effect closure of the contacts 110 and 112, thereby to energize the electromagnet 105, with which the latter contacts are connected in series. The energization of the electromagnet 105 connects the impedance 102 in the primary circuit of the transformer to limit the charging rate and also starts the timing switch 15. The opening of the contacts of either timing switch breaks the input circuit to the primary winding of the transformer and thereby stops the operation of the system upon the expiration of either time period.

With this arrangement, the maximum charging period is limited to a pre-selected time. If, however, the battery approaches its fully charged condition in a time less than the maximum, the charging rate is reduced for providing a finish charge, and the duration of that finish charge is limited.

While I have illustrated a preferred embodiment of my invention, modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

A timer comprising two separate electric timing motors, a cam for each motor, gearing and clutch means connecting each motor and the corresponding cam to drive the same, one motor driving one cam over one travel range corresponding to one timing period, the other motor driving the other cam over another traveling range corresponding to another timing period, the other timing period being longer than the one timing period, a pair of electric switches controlled by said cam, each cam having its own switch, said switches being respectively operated at the termination of their respective cam controlled timing periods, a single manual control, gears associated with said manual control and movable into engagement with the gear drive for said two cams for simultaneously moving said two cams toward one end of their respective travel ranges, the manually controlled gears for said one cam having a portion thereof free of gear teeth and the gear ratio being such that said one cam reaches its end of its travel range when said other cam has only reached an intermediate point, said manual control being susceptible to further manipulation to move said other cam any desired amount after said one cam has been reset without disturbing said one cam.

JAMES H. HALL.

References Cited in the file of this patent

UNITED STATES PATENTS

| Number | Name | Date |
|---|---|---|
| 1,430,107 | Ogden | Sept. 26, 1922 |
| 1,786,280 | Woodbridge | Dec. 23, 1930 |
| 1,851,592 | Paschen et al. | Mar. 29, 1932 |
| 2,224,593 | Brown et al. | Dec. 10, 1940 |
| 2,227,118 | Amsden | Dec. 31, 1940 |
| 2,295,993 | Gruettner | Sept. 15, 1942 |
| 2,346,694 | Maris | Apr. 18, 1944 |
| 2,456,978 | Medlar | Dec. 21, 1948 |

FOREIGN PATENTS

| Number | Country | Date |
|---|---|---|
| 580,546 | Great Britain | Sept. 11, 1946 |